Figure 1:
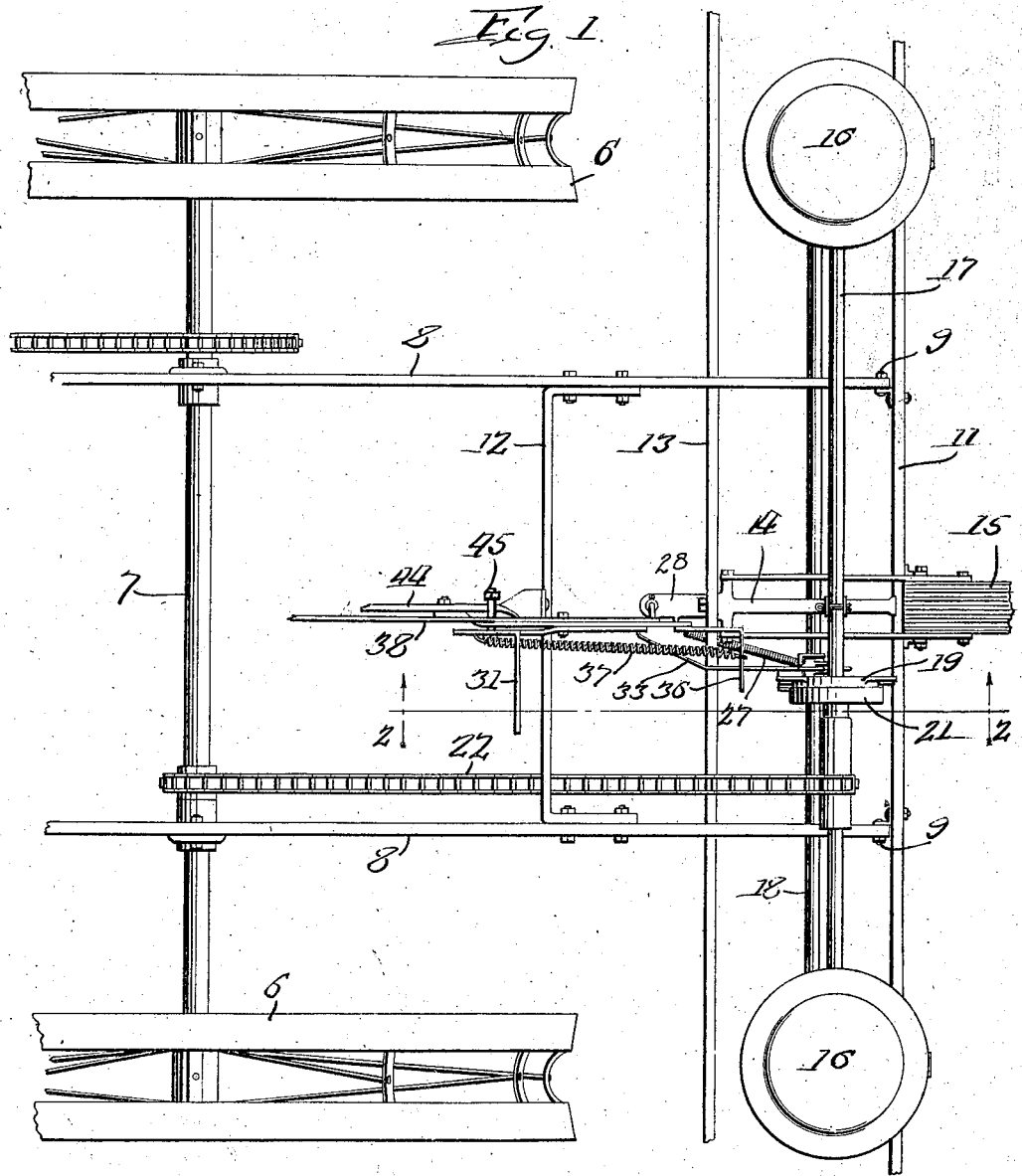

Feb. 8, 1927. 1,616,933
H. R. TRAPHAGEN
DRILL AND CHECK CONTROL FOR PLANTERS
Filed July 8, 1920 3 Sheets-Sheet 1

Patented Feb. 8, 1927.

1,616,933

UNITED STATES PATENT OFFICE.

HARRY R. TRAPHAGEN, OF ROCKFORD, ILLINOIS, ASSIGNOR TO EMERSON-BRANTING-HAM COMPANY, OF ROCKFORD, ILLINOIS, A CORPORATION OF ILLINOIS.

DRILL AND CHECK CONTROL FOR PLANTERS.

Application filed July 8, 1920. Serial No. 394,826.

This invention pertains in general to seeders and planters, and has more particular reference to check-row planters of that class adapted also for drilling.

One of the primary objects of this invention is to provide a control mechanism of novel construction for causing the seeding mechanism to either drill the seed or drop it intermittently for hill planting, the latter being effected either by operation of a check-row wire or at will by operation of a foot lever.

According to my invention, the control mechanism is so constructed that the seeding mechanism will be automatically rendered inoperative each time the planter is raised, irrespective of whether such mechanism is in condition for drilling or checking.

A further object is to operate the seeding mechanism by means of a clutch on the drill shaft which is controlled by a clutch control member on the check shaft, which member in turn is rendered operative for drilling or checking by the setting of a single control member disposed within convenient reach of the operator. In this regard, I have also aimed to provide means including a foot lever which may be actuated at will when the parts are in the check position so that the operator may check by foot operation at the end of the rows independently of the check wire action.

Still another object is the provision of a control mechanism of the character described constructed in such simple and practical manner as to enable production at a comparatively low cost.

Other objects and attendant advantages will be appreciated by those skilled in this art as the invention becomes better understood by reference to the following description when considered in connection with the accompanying drawings, in which—

Figure 2:
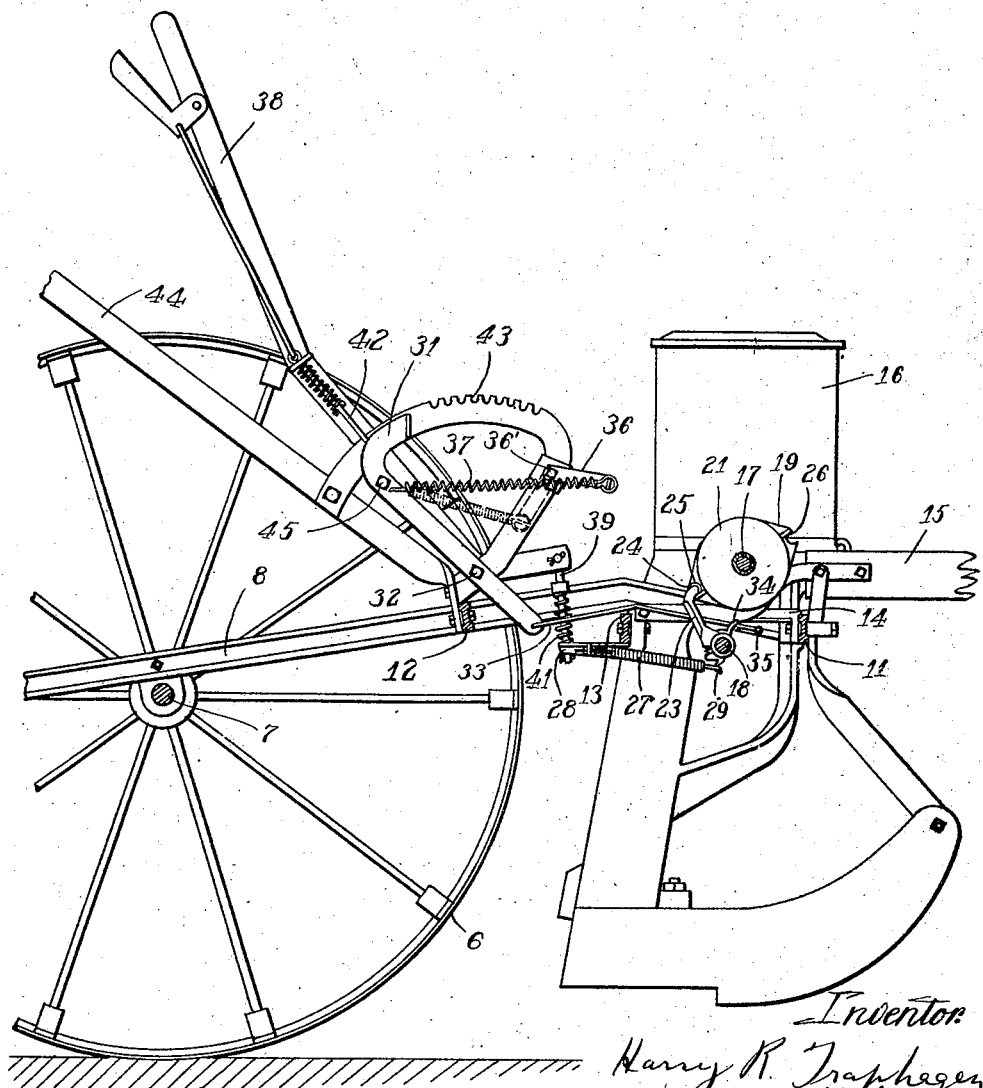
Figure 3:
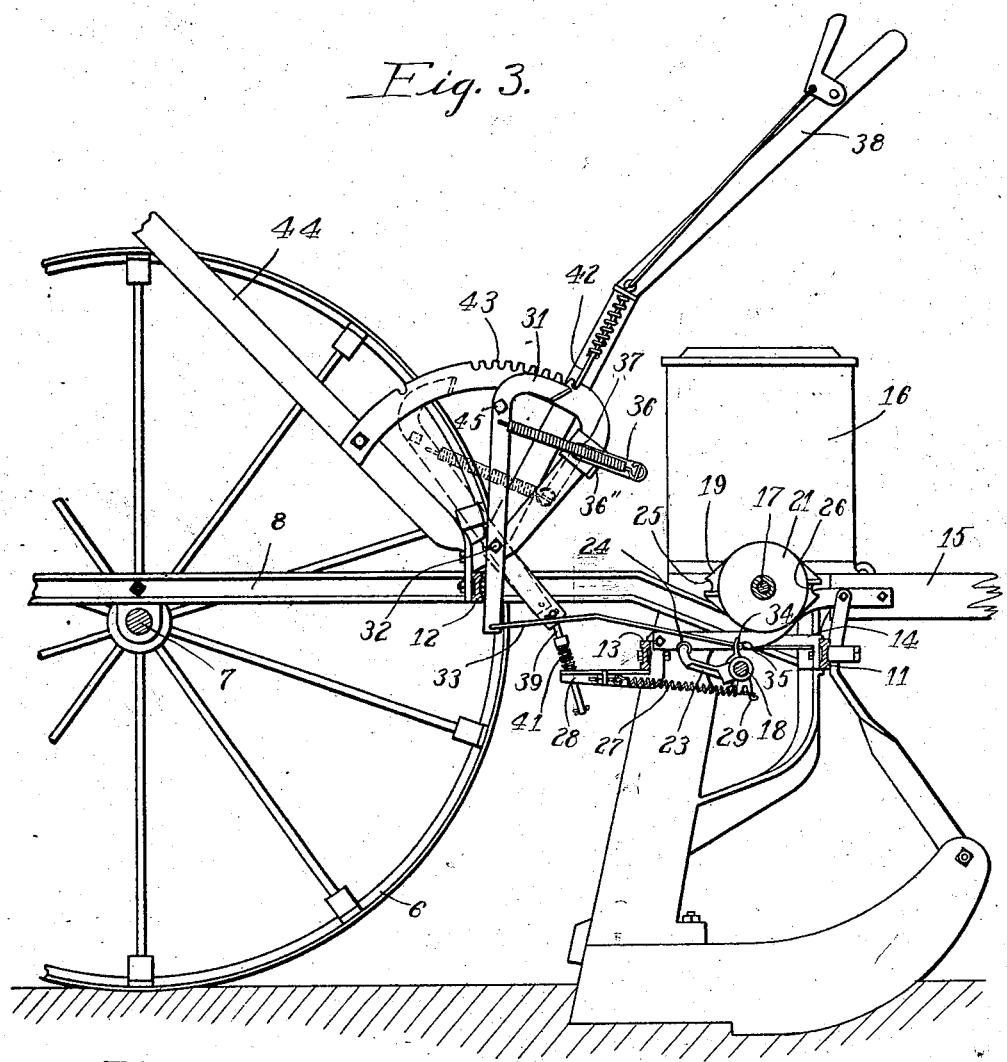
Figure 4:
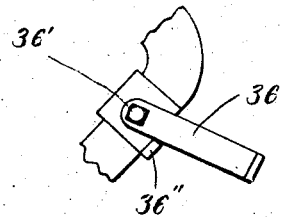

Figure 1 is a plan view showing a planter equipped with my invention;

Fig. 2, a fragmentary sectional view taken on the line 2—2 of Fig. 1, showing the planter in raised inoperative position;

Fig. 3, a similar sectional view showing the planter in lowered working position with the control parts in condition for drilling; and Fig. 4 is a detailed view described hereinafter.

In the drawings I have illustrated only such parts of a check-row planter as are necessary for an understanding of my present invention. The two-row planter shown is of conventional design comprising carrying wheels 6 supporting an axle 7 upon which is mounted the longitudinal sills 8 of the planter frame, which sills are pivotally connected at their forward ends 9 to the front cross sill 11 of the runner frame and are further connected together by a cross bar 12. Only the front and rear cross sills 11 and 13 respectively, of the runner frame are shown, these sills being connected in rigid relative relation by a bracket designated generally by 14 to the forward end of which is attached the tongue 15. The seed boxes 16 are simply shown in outline, and it will be understood that the seeding mechanism thereof is in driving connection with the drill shaft 17, and that the valves of such mechanism are adapted to be opened and closed by oscillation of the check shaft 18. In planters of this type which are used generally for corn and cotton planting, the seeding mechanism is adapted to be continuously driven by rotation of the shaft 17 for the purpose of drilling in the seed, in which event the valves in the seed chute are held open. These planters also include suitable devices mounted on the outer ends of the runner frame for oscillating the check shaft 18 through actuations of the tappets or knobs on the check wire for hill planting.

According to the present invention, I have mounted on the shaft 17 a clutch including a member 19 fixed to the shaft and a member 21 loose thereon and continuously revolved in a clockwise direction viewing Fig. 2, by means of a chain 22 (Fig. 1) driven from one of the main carrying wheels. This clutch may be of any suitable or preferred construction adapted for continuous or intermittent engagement. When said clutch remains engaged the shaft 17 will be continuously rotated by the chain 22, thus continuously rotating the seeding mechanism in the seed box 16 for drilling. Intermittent engagement of the clutch is effected by a clutch control member or arm 23 which is adapted to be moved in one direction to engage the clutch by means of the check wire through the intermediary of parts not shown, and in the opposite direction by the action of a spring to disengage the clutch after the shaft 17 has been rotated a half revolution. This intermittent half-revolution movement will be effected each time the clutch control member is actuated, as will be presently described although if such member is held permanently in a position effecting clutch engagement the shaft 17 will be continuously revolved so as to operate the seeding mechanism for continuous drilling. Instead of mounting the clutch control member co-axial with the clutch as is the general practice, I have mounted such member on the check shaft 18. As shown in Fig. 2, this clutch control member 23, fixed to the shaft 18 carries at its outer end a roller 24 adapted to be moved into and out of either of the sockets or recesses 25 or 26 in the clutch member 19. When disposed in one of said recesses as shown in Fig. 2, the clutch is disengaged and the member 21 turns idly. When withdrawn as shown in Fig. 3, the clutch will be engaged so as to continuously revolve the drill shaft 17. A contractile spring 27 connected to a rearward extension 28 of the bracket 14 and to an arm 29 fixed to the shaft 18, constantly urges the latter in a clockwise direction so that when this shaft is free to move in this direction, the roller 24 will be urged into clutch-releasing position, and when the shaft 17 has made a half-revolution, this roller will drop into the next approaching recess and disengage the clutch. The shaft 18 is adapted to be moved in a counter-clockwise direction to withdraw the roller 24 either by operation of the check-wire mechanism or by operation of an auxiliary lever 31 at present in the form of a foot lever. This lever pivotally mounted on the planter frame at 32, is connected at its lower end through means of a link 33 with an arm 34 fixed to the shaft 18. The link 33 is adapted to pass freely through an opening in the arm 34 and has a stop 35 which, when the link is drawn rearwardly by forward pressure on the foot lever 31, will strike the arm 34 and oscillate the shaft 18 in a counter-clockwise direction to thereby withdraw the control member 23 from either socket 25 or 26 of the clutch and cause the clutch to be engaged. It will be apparent, therefore, that the position of the foot lever 31 governs the position of the control member 23 which in turn controls the operative position of the clutch. Means is provided for optionally holding the foot lever 31 either in a position to effect constant drilling, as shown in full lines in Fig. 3, or for allowing said lever to assume the dotted line position shown in said figure from which it may be moved forward for "checking" or hill planting. This means comprises a lever arm 36 pivotally connected at 36′ to a segment bracket (which will be presently described) and connected at its opposite end to a coiled contractile spring 37 which in turn is connected to the lever 31. The lever arm 36 is adapted to be swung back and forth between the full and dotted line positions, shown in Fig. 2. When this lever is swung in a clockwise direction to the forward or full line position shown in Fig. 2 its front end will be carried below a plane connecting the centers between the pivot bolt 36′ and the connection between spring 37 and lever 31. This disalignment or off-center position will be maintained by the pull of the spring 37 which draws the lever arm 36 downwardly against a suitable stop 36″ on the segment bracket referred to. The lever arm 36 may obviously be swung in a counter-clockwise direction to the dotted line position shown in Fig. 2. The purpose of these two positions of the lever arm 36 will be presently described.

When the planter is in the working position the runners will be in the ground, this position of the parts being shown in Fig. 3. The runners are adapted to be raised and lowered by operation of a hand lever 38. When it is desired to raise the runners, the operator will pull rearwardly on the lifting lever 38 pivotally mounted on the main frame at 32 and connected at its lower end through means of a link 39 and a spring 41 with the rearward extension 28 of the runner frame mentioned above. This lever 38 co-operates in the usual manner through means of a latch 42 with a notched segment 43 on the planter frame, this segment being connected in the present instance, to the seat bar 44, so that the control mechanism will be disposed immediately in front of the operator and within convenient reach. When the lever 38 is drawn rearwardly from the position shown in Fig. 3, to that in Fig. 2, for raising the planter, it will engage a laterally extending stop in the form of a bolt 45 on the foot lever 31 so as to also swing this latter lever rearwardly, thus moving the stop 35 forwardly away from the arm 34 and permitting the spring 27 to move the arm 23 upwardly and bring its roller 24 into engagement with the next approaching notch in the driven member of the clutch for the purpose of disengaging the same and stopping the seeding operation. It will thus be seen that upon raising the runner frame, the seeding mechanism will be automatically disengaged.

For the purpose of planting by check wire, the member 36 will be swung in a counter-clockwise direction to the dotted line position shown in Figs. 2 and 3, thereby relieving the pressure or forward pull of the spring 37 on the foot lever so that the latter will assume the dotted line position shown in Fig. 3 and will allow the clutch-control member 23 to hold the clutch disengaged under the influence of the spring 27. It follows that the shaft 18 may now be freely actuated by the check wire for hill planting. In the event that the operator should desire to plant one or more hills independently of the check wire, he may do so by simply pressing forward on the lever 31, thereby producing the same effect on the shaft 18 as a check wire actuation thereof. Upon releasing the foot pressure the spring 27 returns the parts to normal position.

From the foregoing it will be manifest that the planter is put in condition for either drilling or checking simply by shifting the member 36 to either of the two positions; that when the planter is in condition for checking and it is desired to plant hills across the ends of the rows independently of the check wire, this may be done by foot operation of the lever 31; and that in any event, upon raising the runner frame the seeding mechanism will be automatically rendered inoperative. The means for attaining these results is exceptionally simple, and special attention is directed to the novel use of the check shaft for carrying a clutch-control member which may be held in position for drilling or checking by the shifting of a single member such as 36. It will be apparent that when the seeding mechanism is lowered and in condition for drilling as shown in full lines in Fig. 3 the lever 38 may be adjusted within a limited range for varying the depth of planting without affecting the action of the lever 31 in holding the clutch control member 23 in the position shown.

It is believed that the foregoing conveys a clear understanding of the objects prefaced above, and while I have illustrated and described but a single working embodiment thereof, it should be understood that considerable change might be made in the construction and arrangement without departing from the spirit and scope of the invention as expressed in the appended claims, in which—

I claim:

1. In a planter, in combination, seeding mechanism; a clutch for operating said mechanism continuously for drilling and intermittently for hill-planting; control means for effecting said continuous and intermittent operation of the clutch including a shaft adapted to be oscillated by a check-wire mechanism for hill-planting, a control member adapted to be set either in a drilling or hill-planting position, and a lever supplemental to the check-wire mechanism adapted to be operated at will for hill-planting when said control member is in the hill-planting position; and means for raising and lowering the seeding mechanism and for causing said clutch to become disengaged upon moving the seeding mechanism to the raised position irrespective of the position of said control member.

2. In a planter, the combination of seeding mechanism, a drill shaft, a check shaft, a clutch on the drill shaft, clutch control arm fixed to the check shaft and adapted to be oscillated for engaging and disengaging the clutch, a lever for raising and lowering said mechanism, an auxiliary lever for actuating said clutch-control arm, a member connected with said auxiliary lever and adapted to be set either in a drilling or a hill planting position, said auxiliary lever being operable at will for hill planting when said member is in the hill planting position, and means whereby the auxiliary lever will be operated by the first-mentioned lever when the latter is moved for raising the feeding mechanism when said member is in the drilling position, to operate the clutch control arm for causing the clutch to become disengaged.

3. In a planter, the combination of seeding mechanism, a drill shaft, a check shaft, means for driving the drill shaft including a clutch, a clutch control arm on the check shaft, a spring constantly urging the clutch control member into a position in which to hold the clutch disengaged, and means adapted to move the clutch control member in a direction to cause the clutch to become engaged including a foot lever and a member adapted to be set either for holding the foot lever in a drilling position or for allowing it to assume a position in which it is adapted to be operated for hill planting.

4. In a planter, the combination of seeding mechanism, a drill shaft, a check shaft, means for driving the drill shaft including a clutch, a clutch control arm on the check shaft, a spring constantly urging the clutch control arm into a position in which to hold the clutch disengaged, means adapted to move the clutch control arm in a direction to cause the clutch to become engaged including a foot lever and a member adapted to be set either for holding the foot lever in a drilling position or for allowing it to assume a position in which it is adapted to be operated for hill planting, and a lever for raising and lowering the seeding mechanism adapted when raising the said mechanism to move the foot lever in a direction to cause the clutch to become disengaged.

5. In a planter, the combination of seeding mechanism, a drill shaft, a check shaft, means for driving the drill shaft including a clutch, a clutch control arm on the check shaft adapted by oscillation thereof for causing the clutch to become engaged and disengaged, a spring constantly urging said clutch control arm into the clutch-disengaging position, means for moving the clutch control arm into the opposite position including a foot lever and a member connected with the foot lever and adapted to be set either in a drilling or a hill planting position whereby to hold said foot lever in a position to produce continuous drilling when set in the drilling position and to permit said foot lever to be actuated for hill planting when set in the hill planting position, and a lever for raising and lowering the planting mechanism adapted to act on said foot lever for moving it to an inoperative position when the seeding mechanism is raised to thereby allow the above-mentioned spring to move said clutch control arm into a position for causing the clutch to become disengaged.

6. In a planter, the combination of seeding mechanism, a drill shaft, a check shaft, means for driving the drill shaft including a clutch, a clutch control arm on the check shaft adapted by oscillation thereof to be moved into and out of connection with the clutch to effect disengagement and engagement thereof respectively, a spring tending to constantly urge said clutch control arm into connection with the clutch for disengaging it, a foot lever adapted for moving said clutch control arm out of connection with the clutch for causing it to become engaged, means comprising a spring acting on the foot lever and a member connected with the spring and adapted to be set either in a drilling or a hill planting position, in the former of which to hold the foot lever in a position to hold the clutch control arm disconnected from the clutch to effect drilling and in the latter to permit said lever to be operated at will for intermittently disconnecting and connecting said clutch control arm to effect engagement and disengagement of the clutch for hill planting, and a lever for raising and lowering the seeding mechanism and acting on the foot lever when said member is in the drilling position for causing the clutch to become disengaged when the seeding mechanism is raised.

HARRY R. TRAPHAGEN.